United States Patent [19]
Brudnicki

[11] Patent Number: 5,396,769
[45] Date of Patent: Mar. 14, 1995

[54] ROTARY ACTUATOR

[75] Inventor: Myron J. Brudnicki, San Pedro, Calif.

[73] Assignee: The United States of America as represented by the Administrator of the National Aeronautics and Space Administration, Washington, D.C.

[21] Appl. No.: 134,441

[22] Filed: Oct. 12, 1993

[51] Int. Cl.⁶ .............................................. F03G 7/00
[52] U.S. Cl. ........................................ 60/528; 60/527
[58] Field of Search ........................... 60/528, 527, 517

[56] References Cited

U.S. PATENT DOCUMENTS

| | | | |
|---|---|---|---|
| 3,725,835 | 4/1973 | Hopkins et al. | 60/528 |
| 4,010,455 | 3/1977 | Stange | 340/224 |
| 4,700,541 | 10/1987 | Gabriel et al. | 60/527 |
| 4,761,955 | 8/1988 | Bloch | 60/527 |
| 4,798,051 | 1/1989 | Foote | 60/527 |
| 4,841,730 | 6/1989 | McDonald | 60/527 |
| 4,887,430 | 12/1989 | Kroll et al. | 60/527 |
| 5,127,228 | 7/1992 | Swenson | 60/528 |

Primary Examiner—Ira S. Lazarus
Assistant Examiner—L. Heyman
Attorney, Agent, or Firm—Robert L. Braod, Jr.; Guy M. Miller; Alan J. Kennedy

[57] ABSTRACT

Rotary actuators and other mechanical devices incorporating shape memory alloys are provided herein. Shape memory alloys are a group of metals which when deformed at temperatures below their martensite temperatures, resume the shapes which they had prior to the deformation if they are heated to temperatures above their austenite temperatures. Actuators in which shape memory alloys are employed include bias spring types, in which springs deform the shape memory alloy (SMA), and differential actuators, which use two SMA members mechanically connected in series. Another type uses concentric cylindrical members. One member is in the form of a sleeve surrounding a cylinder, both being constructed of shape memory alloys. Herein two capstans are mounted on a shaft which is supported in a framework. Each capstan is capable of rotating the shaft. Shape memory wire, as two separate lengths of wire, is wrapped around each capstan to form a winding around that capstan. The winding on one capstan is so wrapped that the wire is in a prestretched state. The winding on the other capstan is so wrapped that the wire is in a taut, but not a prestretched state. Heating one performs work in one direction, thus deforming the other one. When the other SMA is heated the action is reversed.

4 Claims, 2 Drawing Sheets

ROTARY ACTUATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention pertains to shape memory alloys. In a more specific aspect the invention relates to rotary actuators incorporating shape memory alloys.

As pointed out in U.S. Pat. No. 5,127,228 shape memory alloys are a group of metals which have mechanical properties having to do with shape memory. These alloys, when deformed at temperatures below their martensite temperatures, resume the shapes which they had prior to the deformation if they are heated to temperatures above their austensite temperatures. Such alloys include Cu-Zn-Al alloys, Cu-Al-Ni alloys, Ni-Ti alloys and the like.

One application of shape memory alloys has been their use in actuators. Actuators include members which, when deformed in some manner, return to their original states. One type of actuator is a bias spring type. When heated, a deformed shape metal alloy (SMA) returns to its original state, overcoming the spring bias. When the SMA member is allowed to cool the spring again deforms the SMA member.

Another type of actuator, termed a differential actuator, uses two SMA members mechanically connected in series. Heating one performs work in one direction, thus deforming the other one. When the other SMA is heated the action is reversed. Such bidirectional devices can be found in U.S. Pat. No. 4,010,455, and U.S. Pat. No. 4,887,430. In U.S. Pat. No. 5,127,228 concentric members are described. One member is in the form of a sleeve surrounding a cylinder, both being constructed of shape memory alloys.

It has been pointed out that bias spring type actuators do not have two positions which are stable. The differential types have several gears such as those in U.S. Pat. No. 5,127,228, or other moving parts rendering them bulky, complex and costly. Hence in the field of rotary actuators there is room for improvement. Such an improved rotary actuator is provided by this invention.

SUMMARY OF THE INVENTION

The rotary actuator herein is a differential type actuator since one SMA member performs work in one direction to deform the other SMA member, to reverse the process. However, gears and the like are eliminated. Rather, capstans are employed, and the shape memory alloy is in the form of a wire. At least two capstans are employed, each of which is separately mounted on a rotatable shaft supported in a framework. Each capstan is capable of rotating the shaft. The shape memory wire is in the form of two separate lengths of wire. One length is wrapped around each capstan to form a winding around that capstan. In order to be able to deform the other, the winding on one capstan is so wrapped that the wire is in a prestretched state. The winding on the other capstan is so wrapped that the wire is in a taut, but not a prestretched state. Means are provided for securing one end of each winding to its capstan, and for securing the other end of each winding to the framework. As will be seen, the ends are so secured (oppositely secured) that the capstans secured thereby are oppositely wound. Additionally, means are included for separately heating each set of windings. Means also selectively activate each heating means to alternately heat the windings above the martensitic state to effect a martensitic phase transformation conferring terminal forces on the wire lengths and angular moments of force on capstans to rotate partially the capstans and the drive shaft connected thereto.

DESCRIPTION OF THE INVENTION

As indicated hereinbefore rotary actuators utilize the characteristics of shape memory alloys which cause them to return to their original shapes when heated above their austensitic temperatures, generally above 125 degrees F., and usually less than 150 degrees F., depending on the alloy. Below the austenitic temperature, shape memory alloys are in their martensitic or low strength states. A more complete understanding of how shape memory alloys are employed herein in the provision of rotary actuators will, perhaps, be more apparent from a description of the invention in conjunction with drawings.

THE DRAWING

The drawing consists of a two figures, FIG. 1, is a top view of a preferred embodiment of the invention.

FIG. 2 is a view similar to FIG. 1 showing an SMA wire heating means other than the SMA wire itself.

DETAILED DESCRIPTION

Figure 1:
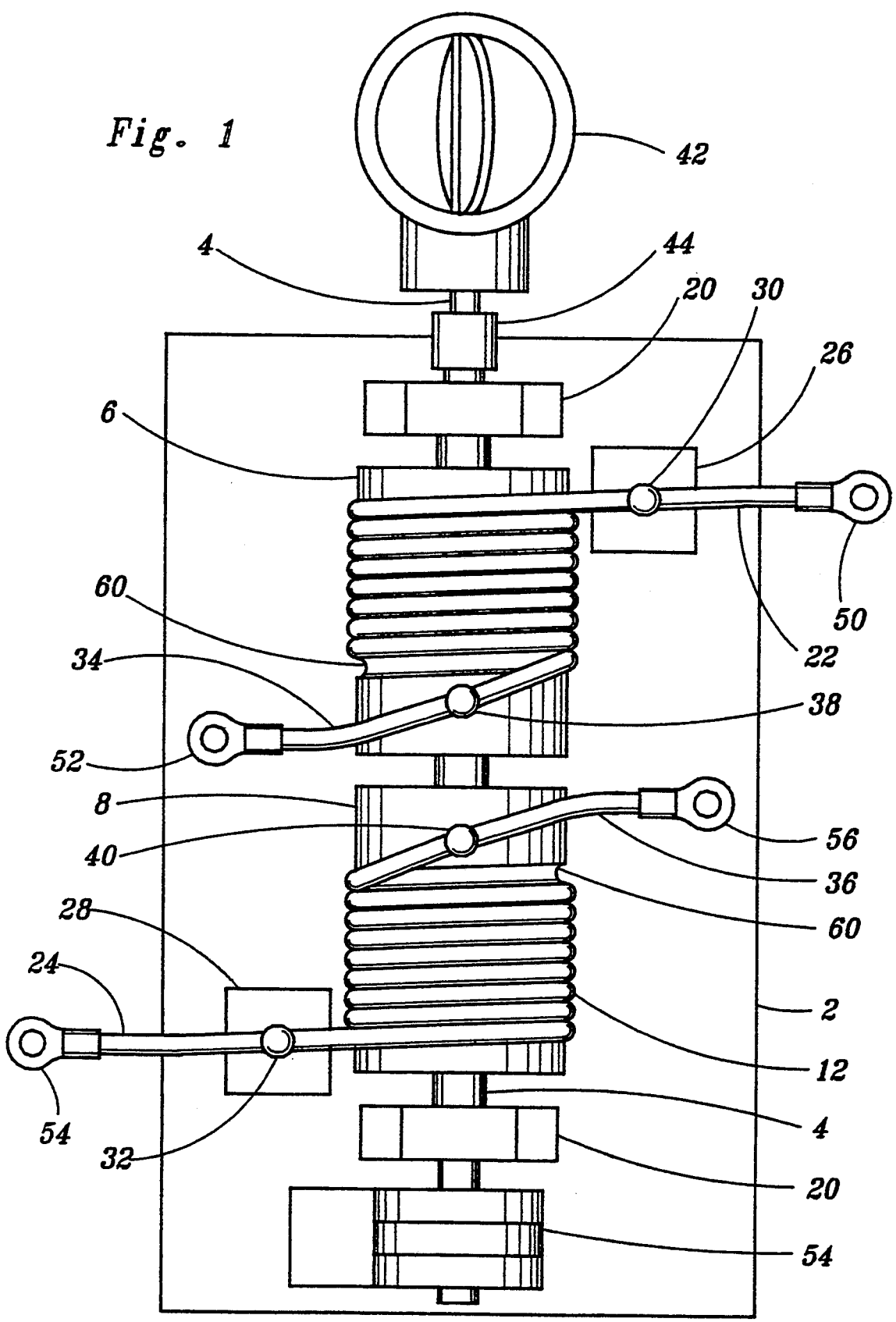

Referring now to FIG. 1, it can be seen that the chief components of the actuator are a supporting structure or base 2, a shaft or axle 4, capstans 6 and 8, and a shape memory alloy in the form of wire windings 10 and 12.

Shaft 4 is journaled in bearings in a ring or race carried in collars or pillow blocks 20. Capstans 6 and 8 are locked on shaft 4 to rotate the shaft when either capstan is rotated.

As shown in FIG. 1, a piece, bit or section of shape memory alloy wire (50 percent titanium and 50 percent nickel) is wound around each capstan. A length of wire, when wound around capstan 6 forms windings 10. The length of wire wound around capstan 8 forms windings 12.

It will be understood that for the operation of the actuator of the invention one end of each length of wire must be attached to its capstan, and the other end of each length must be attached to the framework. For this purpose blocks 26 and 28 are secured to framework 2. In addition, to make the wire oppositely wound, different ends of the wire are attached to each block, and to each capstan.

Viewing FIG. 1 with butterfly valve 42 at the top as shown, the top end 22 of the windings on capstan 6 is attached to the block (26), whereas it is the bottom end 24 of the wire on capstan 8 which is attached to the block (28). Herein this is accomplished by beads and recesses. For anchoring opposite outer ends 22 and 24 in framework 2, blocks 26 and 28 are fixed on or integral with framework 2. To secure the outer ends 22 and 24 of each wire length each block is provided with a recess, and each wire has a bead 30 and 32 securely attached thereto. When a bead 30, or 32, is snapped into a hole or recess (not shown) in block 26 or 28, the wire ends are held by the blocks as shown in FIG. 1.

By press fitting, opposite wire ends 34 and 36 are similarly fastened in recesses in the capstans. Beads 38 and 40 are locked on inner wire ends 34 and 36, and these beads are pressed into recesses in capstan 6 and 8 as can be seen in FIG. 1.

Having characterized the chief components of the invention, its operation will now be described. In the embodiment herein a butterfly valve 42, shown in its open position in FIG. 1, is attached to the end of drive shaft 4 by means of collar 44. This valve is operated by the rotary actuator of the invention. The device is designed to use SMA wire to transmit torque. One length of SMA wire 10 is attached to capstan 6 through the use of bead 38, and the other end is attached to the housing or base 2 by bead 30. Using block 26 and bead 30 as an anchor SMA wire 10 is prestretched two percent when it is wrapped around capstan 6. An equal and oppositely wound length of wire 12 is wrapped around a second capstan 8 in a taut but not prestretched condition.

When the prestretched SMA wire 10 is heated by momentarily applying a specified amount of electrical power through electrical connections 50 and 52, the wire will quickly return to its original length, causing capstan 6, shaft 4, and butterfly valve 42 attached thereto, to rotate a predetermined number of degrees (herein about 90 degrees).

The torque developed during the shrinking of heated SMA wire 10 is sufficient to prestretch the equal and oppositely wound wire windings 12 on capstan 8. This torque provides a net output or pay load torque at the butterfly valve 42. The net output torque thus drives the rotary valve from an open to a closed position.

Subsequent heating of the second wire windings 12 causes capstan 8 to be rotated (approximately 90 degrees) in the opposite direction with a net output torque available for valve actuation in that direction. Thus by alternately applying electrical power to the two SMA wire windings, the actuation of the butterfly valve can be cycled between its open and closed positions. The capstans are designed to conduct the heat from the SMA wire following each electrical heating application to quickly return the SMA wire to its martensitic low strength condition so that the down time between cycles is kept to a minimum.

It can be seen that the rotary actuator of the invention does not require inner and outer gears and concentric heating elements as does the unit described in U.S. Pat. No. 5,127,228. A rotary actuator is provided herein which can be more readily controlled. The only control necessary is stop means 54 which prevents overrun when the SMA on one capstan is converted from its martensitic to its austenitic state. Since there may be a 5 percent error as the alloy resumes the shape or state in which it existed prior to deformation such stop means are desirable for some of the more accurately operatting devices. To maintain the desired angle of shaft rotation, and to control any overrun, cams, detents and similar stop means 54 can be employed. In addition to the valve application illustrated, then, the rotary actuator can replace motors and solenoids in a great many applications in a broad array of industries. Examples are automotive door locks, carburetor controls, air conditioning damper controls and similar industrial uses. In some instances they can also replace electric gear motors.

Figure 2:
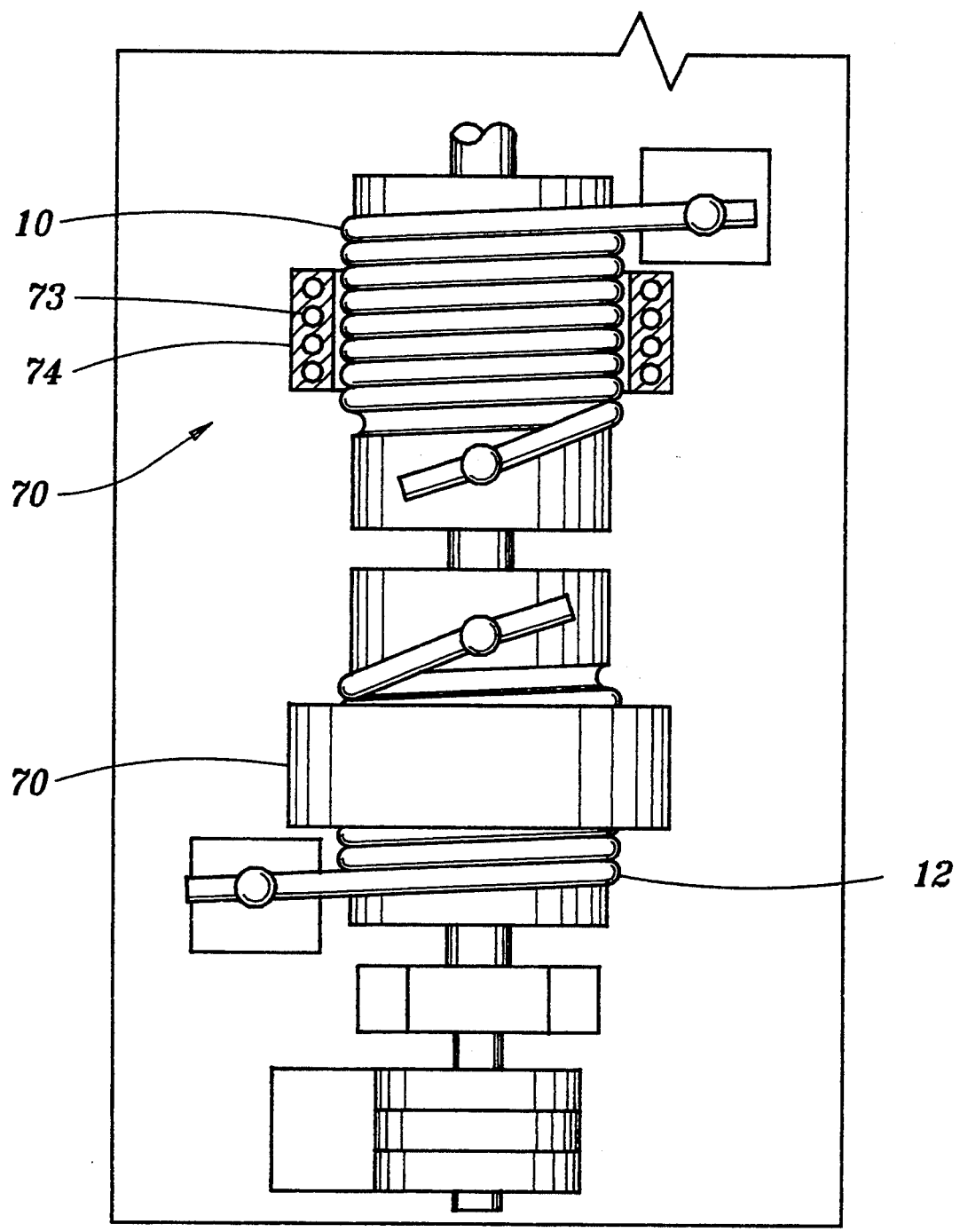

Having been given the teachings of this invention variations and ramifications will occur to those skilled in the art. As an example the ends of the wire wrapped around the capstans can be anchored by means other than beads in recesses such as wrapping and crimping, looping and the like. In addition other heating means are available in lieu of current flow in the wire itself. Such a heating means is illustrated in FIG. 2. Band heating means 70 have been placed around windings 10 and 12. The outside of a band heater is shown around windings 12. The band heater around windings 10 is cut away to show heating elements 73 which are held by band or collar 74. The heating means are connected to a source of electricity not shown. Thus, heating elements can be wrapped around the capstans or they can be imbedded in them. Electrical automatic switching means are also well know for controlling current flow to the heating elements.

Another variation is shown in FIG. 1. To permit more uniform wrapping to form the windings, grooves 60 can be formed in the capstan outer surfaces. Further, the capstans can be fabricated out of, or covered with, a material such as polytetrafluoroethylene ("Teflon") to provide a smooth surface so that the SMA wire can easily reshape, that is, change from state to state. It will be appreciated too that the angle of rotation is a function of the length of wire, and the torque of the device is a function of the number of capstans. Thus to increase or enlarge the angle a larger capstan with more windings can be employed, and to increase torque additional capstans can be used. It is also possible to wrap a capstan in series using several stops or beads to increase the angle of rotation. Such modifications and others occurring to those in the art are deemed to be within the scope of this invention.

What is claimed is:

1. A rotary actuator comprising at least two capstans, each separately mounted on a rotatable shaft supported in a framework, each capstan being capable of rotating the shaft, a shape memory alloy in the form of wire, the shape memory wire being in the form of two separate lengths of wire, one wrapped around each capstan to form a winding, the winding on one capstan being so wrapped that the wire is in a prestretched state, the winding on the other capstan being so wrapped that the wire is in a taut rather than prestretched state, means securing one end of each winding to its capstan, means securing the other end of each winding to the framework, the ends being so secured that the capstans are oppositely wound, means for separately heating each set of windings, means for selectively activating each heating means alternately to heat the windings to effect a martensitic phase transformation conferring terminal forces on the wire lengths and angular moments of force on capstans to rotate partially the capstans and the drive shaft connected thereto.

2. The rotary actuator of claim 1 including stop means limiting the partial rotation to a predetermined number of degrees.

3. The rotary actuator of claim 1 wherein the heating means include a power source and electrical connectors for conducting a current through the wires.

4. A rotary actuator comprising at least two capstans, each separately mounted on a rotatable shaft supported in a framework, each capstan being capable of rotating the shaft, a shape memory alloy in the form of wire, the shape memory wire being in the form of two separate lengths of wire, one wrapped around each capstan to form a winding, the winding on one capstan being so wrapped that the wire is in a prestretched state, the winding on the other capstan being so wrapped that the wire is in a taut rather than prestretched state, means securing one end of each winding to its capstan, means securing the other end of each winding to the framework, the ends being so secured that the capstans are oppositely wound, means for separately heating each set of windings, means for selectively activating each heating means alternately to heat the windings to effect a martensitic phase transformation conferring terminal forces on the wire lengths and angular moments of force on capstans to rotate partially the capstans and the drive shaft connected thereto, the heating means including heating elements.

* * * * *